United States Patent [19]

Heller

[11] Patent Number: 4,810,024

[45] Date of Patent: Mar. 7, 1989

[54] SHOE GUARD MAT

[76] Inventor: Renee Heller, 85 Roselle Ct., Lakewood, N.J. 08701

[21] Appl. No.: 96,366

[22] Filed: Sep. 14, 1987

[51] Int. Cl.[4] ............................................. B60N 3/04
[52] U.S. Cl. ................................................. 296/97.23
[58] Field of Search ........................... 296/1 F; 15/238

[56] References Cited

U.S. PATENT DOCUMENTS 4,262,048  4/1981  Mitchell .............................. 296/1 F

FOREIGN PATENT DOCUMENTS 1806815  5/1970  Fed. Rep. of Germany ...... 296/1 F
 222832 10/1986  Japan .................................. 296/1 F

OTHER PUBLICATIONS

Shoesaver, Starcrest of California 9-1987.

Primary Examiner—Robert R. Song
Attorney, Agent, or Firm—Peter L. Michaelson

[57] ABSTRACT

Apparatus for a shoe guard mat, specifically a mat adapted to be placed on the floor of an automobile or other vehicle, regardless of whether the floor is bare, carpeted or has carpeted matting located thereon, to protect the shoes of the vehicle operator from abrasion is disclosed herein. The inventive shoe guard mat has a soft top surface with a relatively tight weave sufficient to prevent stones from becoming embedded in the top surface of the mat and subsequently rubbing against and, over time, abrading the driver's shoes.

17 Claims, 2 Drawing Sheets

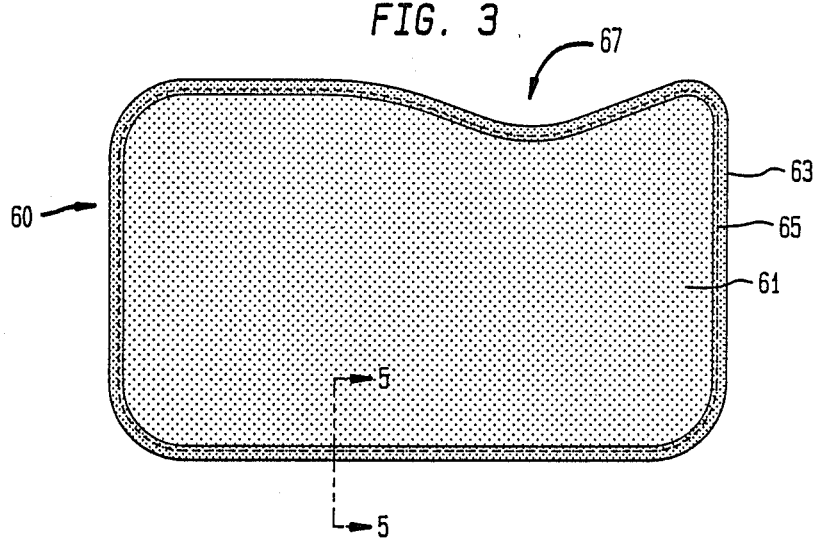
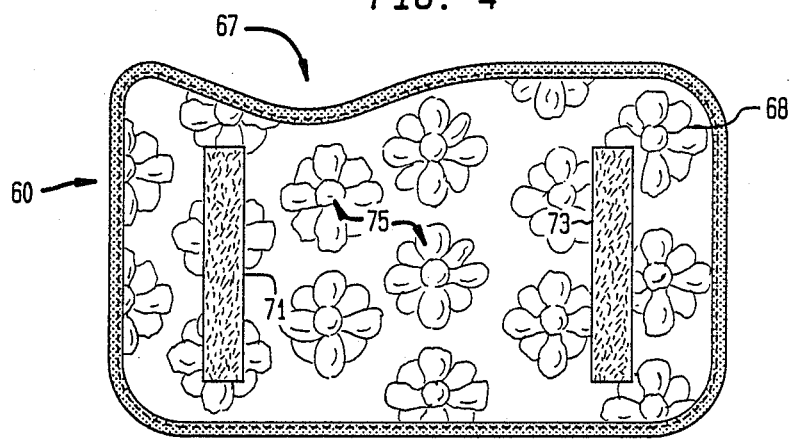
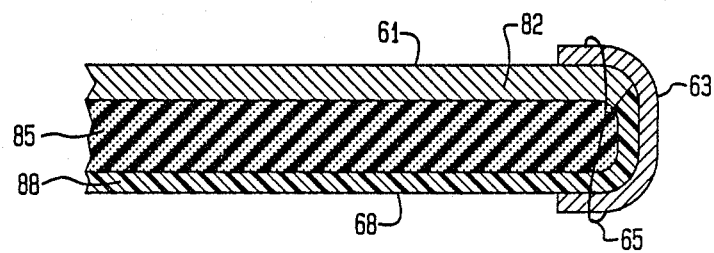

SHOE GUARD MAT

BACKGROUND OF THE INVENTION

1. Field of the Invention

The invention relates to apparatus for a shoe guard mat, specifically a mat adapted to be placed on the floor of an automobile or other vehicle, regardless of whether the floor is bare, carpeted or covered with carpeted matting located thereon, to protect the shoes of the vehicle operator from abrasion.

2. Description of the Prior Art

A driver's shoes often become abraded by repeated contact, over time, with abrasive objects (such as small stones, small pieces or glass and/or metal and the like) that accumulate on the floor of a vehicle and have become embedded within the floor and particularly within carpeting or carpeted matting located on the driver's side of a vehicle, such as an automobile.

Specifically, to provide increased comfort, automobiles are generally provided with carpeting located on the entire floor of the vehicle. This carpeting has a sufficiently deep and loose pile to afford comfort to the driver of the automobile and the passengers. Unfortunately, the carpeting generally traps abrasive objects over time. Since people spend a great deal of time in their automobiles, the carpeting has a tendency to wear out by repeated contact with the shoes of the driver and passengers. This problem is particularly acute for the carpeting located under the driver's feet inasmuch as this section of carpeting gets the most wear.

Now, to protect the carpeting, vehicle owners frequently install carpeted mats over the carpeting in those areas of the vehicle that will be underfoot of both the drivers and passengers. Unfortunately, the carpeting used in these carpeted mats is often the same type as that used in the car. While such mats do indeed protect the carpeting in the automobile, these mats have the same tendency to accumulate embedded stones over time that are carried into the car by the underside of the driver's shoes.

Consequently, regardless of whether the automobile has carpeting alone or has carpeted mats located over the carpeting, the heel of the driver's shoe, particularly that on his or her right foot, generally abuts against and pivots on the carpeted mat or carpeting while the heel of this shoe depresses the foot pedals (accelerator or brake pedals) while the car is being driven. As such, the lower sides and rear area on both sides of the driver's right shoe continuously rubs back and forth against the mat or carpeting over time. Because of the abrasive objects embedded within the carpeted mat or carpeting, the lower sides and back portion of the driver's shoe become abraded by continual contact with these abrasive objects. This abrasion is worsened over time since the piling in the carpeting or carpeted matting often flattens as the carpeting and/or carpeted matting becomes worn or from the weather elements such as rain or snow. In any event, this abrasion removes any shine located on these portions of the driver's right shoe, thereby necessitating repeated polishing of the driver's shoes. In addition, if the abrasion becomes severe, it degrades the appearance of the right shoe to the point at which the driver must replace both shoes. Since this abrasion shortens the useful life of the shoes, this increases the amount of money the driver must spend for shoes. This abrasion may also exist on the left shoe for those drivers that use their left foot to operate a clutch pedal in a car having a manual transmission.

A solution currently exists in the art to remedy this problem; however, this solution possesses various drawbacks. In particular, this solution involves slipping a protective member, such as a suitably shaped piece of plastic, over the rear portion of each of the driver's shoes. Unfortunately, while this solution is effective at preventing abrasion, this solution requires effort on the part of the driver both to install and remove the protective members from both of his or her shoes. As such, the driver will often neglect to install these members on the shoes in his or her haste to get into the automobile and drive away. Therefore, it more likely than not that a driver will cease using these protective members shortly after they have been obtained. Moreover, once these protective members are slipped onto the shoes, they are quite likely to diminish the appearance of the shoes and, hence, for that reason, may not be used again by the driver.

Another solution often seen in the art involves positioning a small swatch of carpet on either the carpeting or the carpeted matting, if the vehicle is so equipped, and located directly under the driver's right and/or left foot. Unfortunately, this carpet is often of a type that still retains embedded abrasive objects and hence causes abrasion of the shoes, although perhaps at a lesser rate than if this carpet were not to be used.

Thus, a need exists in the art for apparatus that could be placed on the floor of an automobile or other vehicle to protect both the right and left shoes of the driver of the vehicle from abrasion. Once positioned, this apparatus would advantageously not require any additional effort on the part of the driver nor would it diminish the appearance of the driver's shoes in any way.

SUMMARY OF THE INVENTION

Accordingly, an object of the present invention is to provide apparatus, such as a mat, that could be placed on the floor of a vehicle such as an automobile, and particularly on either existing carpeting or on carpeted matting located on the floor and situated under the driver's feet, to protect the driver's shoes from abrasion.

A specific object is to provide such apparatus which protects both the right and left shoes of the driver.

A further specific object is to provide such apparatus that is very likely to be used by the driver once it is appropriately installed in the vehicle.

A more specific object is to provide such apparatus which, once it is installed, does not require any additional effort on the part of the driver.

These and other objects are accomplished in accordance with the teachings of the present invention by apparatus that comprises a mat that has been cut to a shape sufficiently large so as to cover an area located on a floor of a vehicle and situated in front of the foot pedals of the vehicle, wherein the area encompasses a likely portion of the floor which will come into contact with a surface of either shoe worn by the driver during operation of the foot pedals of the vehicle; wherein the mat further specifically comprises: a flat, thin, resilient material that has been cut to this shape; and a protective material for forming a top surface of the mat wherein the protective material is affixed to one side of and overlies the resilient material and has substantially the same shape thereof, and wherein the protective material has a flat outer surface that is sufficiently tight to prevent abrasive objects (such as stones, pieces of glass and the like), that are likely to accumulate on the floor of the vehicle, from becoming embedded in the outer surface.

In accordance with a preferred embodiment disclosed herein, the inventive mat is formed of a sandwich of three materials all sewn together around their peripheral edges. A thin flat sponge layer forms the central portion of the mat and is bounded on one side by the protective material which is a fleece like material that has a relatively tight weave. The reverse side of the fleece material forms the top surface of the mat. The sponge layer imparts a degree of resiliency to the mat, thereby providing some additional cushioning to the driver's feet. The opposite side of the sponge layer is adhesively secured to a relatively thin plastic layer. One surface of the plastic layer, which forms the rear surface of the inventive mat and abuts against the floor of the vehicle, is textured somewhat to prevent the inventive mat from sliding on the floor, whether carpeted or not, of the vehicle. In addition, two interlocking strip fasteners are used to securely fasten the inventive mat to the floor of the vehicle while also allowing the inventive mat to be easily removed from the floor for cleaning and the like.

BRIEF DESCRIPTION OF THE DRAWING

The teachings of the present invention can be readily understood by considering the following detailed description in conjunction with the accompanying drawing, in which:

FIG. 3 depicts a top view of inventive shoe guard mat 60, shown in FIG. 2;

FIG. 4 depicts a bottom view of inventive shoe mat 60, shown in FIG. 2; and

FIG. 5 depicts a partial cross-sectional view of inventive shoe mat 60 taken along lines 5—5 shown in FIG. 3.

To facilitate understanding, identical reference numerals have been used to denote identical elements that are common to the figures.

DETAILED DESCRIPTION

After reading the following description, those skilled in the art will readily appreciate the teachings of the present invention are applicable to a mat which can be positioned on the floor of any vehicle, regardless of whether the floor is bare, carpeted or has carpeted matting located thereon, to prevent the shoes of the driver of the vehicle from being abraded by embedded abrasive objects (such as small stones, small pieces of glass, metal or the like) that come into contact with the driver's shoes during operation of the vehicle. For purposes of illustration but not limitation, the invention will be discussed in the context of a mat particularly suited to use in automobiles and adapted for placement on carpeted matting located under the shoes of the driver.

Figure 1:
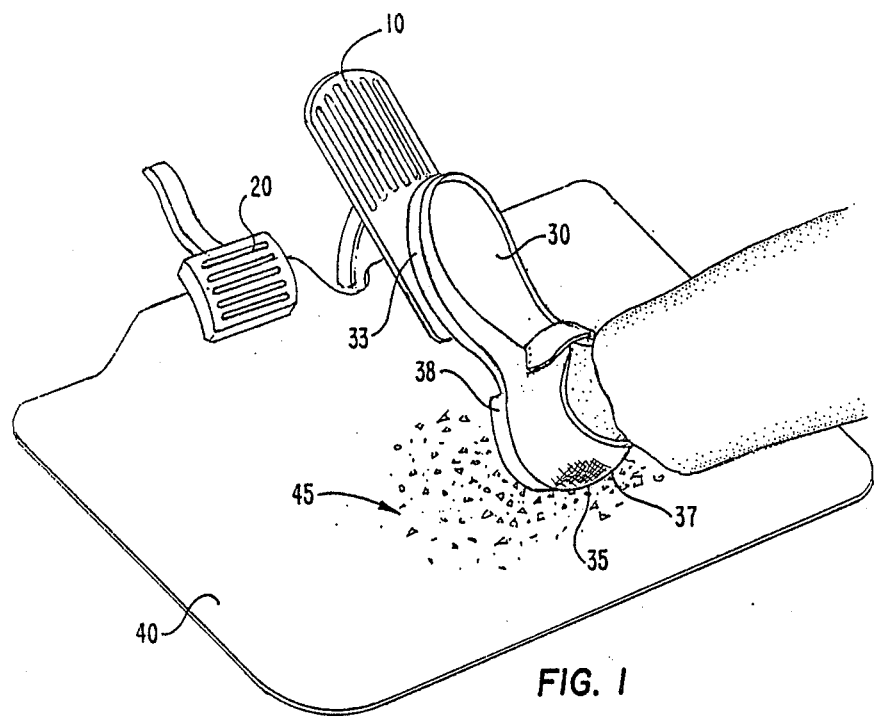
FIG. 1 depicts a simplified perspective view of the floor of a driver's position of a typical automobile.

FIG. 1 depicts a simplified perspective view of the floor of a driver's position of a typical automobile. As shown, the floor of the automobile in the driver's position is generally carpeted (by well known carpeting not shown) which, in turn, is covered by a well known carpeted mat, typified by carpeted mat 40. This mat can also be a well-known rubber or plastic mat that has grooves on its outer surface which contacts the driver's shoes. Nonetheless, for the sake of simplicity, mat 40 will hereinafter be referred to and described in the context of a carpeted mat. Accelerator pedal 10 and brake pedal 20 form part of the automobile and are controlled by the position of driver's right foot. This foot is covered by shoe 30. Generally, to control both of these foot pedals, the driver's right foot is positioned such that a rear portion of heel 38 pivots against carpeted mat 40 while the sole 33 contacts against and depresses either accelerator pedal 10, as shown, or brake pedal 20 an appropriate distance. Frequently, the underside of the driver's shoe tracks small abrasive objects 45 (such as small stones, small pieces of glass and/or metal or the like) onto carpeted mat 40. Carpeted mat 40 frequently has a sufficiently deep and loose pile to afford comfort to the driver. Unfortunately, this type of pile also causes abrasive objects 45 to become embedded, over time, in the carpeting of mat 40.

Now, as the driver's right foot pivots against the mat to control the brake, rear area 35 and back area 37 on the surface of shoe 30 rub against carpeted mat 40. An area similar to rear area 35 in size and location but situated on the surface of the opposite side (not shown) of the shoe may alternatively rub against the carpeted mat whenever the driver depresses the accelerator pedal. The areas of shoe 40 which rub against the carpeted mat depend upon the direction in which the foot is tilted with respect to carpeted mat 40 and the point at which heel 35 contacts the carpeted mat. Because abrasive objects 45 are embedded within the piling of carpeted mat 40, the areas of shoe 30, which rubs back and forth against the carpeted mat, contact these objects which, over time, disadvantageously abrades these areas of the right shoe. If, in addition, the driver utilizes his left foot to control a clutch in an automobile with a manual transmission, then similar abrasion will disadvantageously occur in similar areas located towards the rear of the driver's left shoe. This abrasion is worsened over time since the piling in carpeted mat 40 often flattens as this mat becomes worn or from the weather elements, such as rain or snow, and thus exposes an increased amount of the surface area of abrasive objects 45 to the rear surfaces of driver's shoes.

In accordance with the teachings of the present invention, abrasion to both the right and left shoe of the driver can be substantially reduced, if not totally, eliminated through use of the inventive shoe guard mat.

Figure 2:
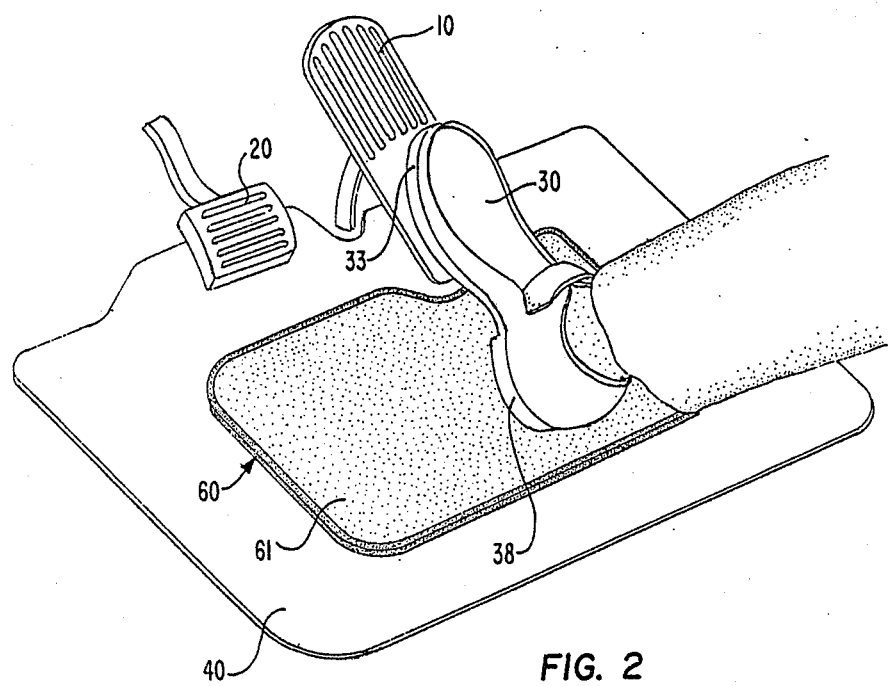
FIG. 2 depicts the same perspective view shown in FIG. 1 with the addition of inventive shoe guard mat 60.

FIG. 2 depicts the same perspective view shown in FIG. 1 with the addition of inventive shoe guard mat 60. Here, the inventive shoe guard mat is positioned over carpeted mat 40 in an area where the driver's right and left shoes are likely to rub against carpeted mat 40. This area is typically situated in front of the foot pedals of the automobile. Top surface 61 of shoe guard mat 60, as discussed in detail below, is relatively soft with a tight weave which does not permit substantially any abrasive objects to become embedded therein. As a result, substantially all of these objects, that have typically been tracked in by the driver's shoes, will merely remain on the top surface of the shoe guard mat and can be easily shaken or brushed off this mat at any time. Since substantially no such abrasive objects embed themselves within shoe guard mat 60 and the surface of this mat is relatively soft, the rear surfaces of shoe 30 do not become abraded through continual contact with the inventive shoe guard mat. Shoe guard mat 60 is advantageously large enough to cover an area on carpeted mat 40 that will come into contact with both the driver's left and right shoes, particularly for use in automobiles with manual transmissions and clutch pedals, and thereby prevent any abrasion from occurring to either shoe. Moreover, by isolating the driver's shoes from carpeted mat 40, the inventive shoe guard mat also advantageously protects carpeted mat 40 from wear and abrasion caused by the driver's shoes.

FIG. 3 depicts a top view of inventive shoe guard mat 60 shown in FIG. 2. As shown, shoe guard mat 60 is approximately rectangular in area to accommodate both the driver's left and right shoes and has a slight depression 67 to fit around a typical hinged accelerator pedal that is affixed to the floor of the automobile. This depression has no effect in automobiles with a so-called hanging accelerator pedal and, in fact, can be eliminated, if desired, if the shoe guard mat is to be used in such automobiles. Inventive mat 60, as shown in FIG. 5 and discussed in more detail later, is comprised of a sandwich of three different materials. A protective material, typically a thin flat dense tightly woven soft cotton fabric such as a plush reverse side of fleece, forms top surface 61. Border (trim) 63, which is also a suitably soft fabric such as satin, is secured by stitching 65 close to and around the entire peripheral edge of shoe guard mat 60 to prevent this mat from separating during use. The tight weave of top surface 61 advantageously prevents abrasive objects from becoming embedded within shoe guard mat 60. Moreover, since the cotton fabric that forms this surface is relatively flat, any abrasive objects and other foreign material that is situated on top surface 61 can be easily removed from mat 60 by simply shaking the mat or brushing these objects off the shoe guard mat at any time. In fact, rather than abrading the rear surfaces of the driver's shoes, the soft nature of top surface 61 is likely to buff the rear surfaces of the driver's shoes as these shoes move back and forth over the mat. Top surface 61 can be treated with any one of many well-known stain repellents, such as SCOTCH GUARD repellent (SCOTCH GUARD is a trademark of the 3M Corporation), to impart a degree of water and stain repellency to the inventive mat.

FIG. 4 depicts a bottom view of inventive shoe mat 60 shown in FIG. 2. Rear surface 68 is formed of a suitable vinyl which provides strength and weather-resistance. The rear surface may be slightly textured, by texture 75, which aids in preventing the inventive mat from sliding under either foot of the driver. To further reduce the likelihood of sliding, one side, such as the "hook" side, of two adhesive backed VELCRO strips 71 and 73 (VELCRO is a registered trademark of Velcro U.S.A., Inc.) may be adhesively secured to rear surface 68, as shown in FIG. 4. Then, both mating portions (the "loop" side—well known and not shown) of the two adhesive backed VELCRO strips are themselves both adhesively secured at appropriate locations on the top surface of carpeted mat 40. The inventive mat is then placed on top of carpeted mat 40 such that both halves of the two VELCRO strips interlock. Generally, these strips should be approximately 5 inches (approximately 12.7 centimeters) long and approximately 0.5 inch (approximately 1.3 centimeters) wide, though these dimensions are not critical. The use of these strips permits the inventive mat to be easily removed for cleaning and then accurately re-positioned back into its original location on the carpeted mat.

FIG. 5 depicts a partial cross-sectional view of inventive shoe mat 60 taken along lines 5—5 shown in FIG. 3. As clearly shown herein and noted above, inventive mat 60 is formed of a sandwich of three materials all cut to the same shape: fleece 82, the plush reverse side of which forms top surface 61; vinyl 88, one surface of which, preferably textured, forms rear surface 68 of mat 60; and a flat thin resilient material 85. In FIG. 4, the thickness of fleece 82 and vinyl 88 has been exaggerated for increased visibility. Resilient material 85 is generally a layer of sponge that is adhesively secured to the vinyl layer. The sponge imparts a degree of resiliency to inventive mat 60 which, in turn, cushions the driver's feet and provides an increased degree of comfort to the driver. The layers are secured together by stitching 65 which runs through border 63 completely around and close to the peripheral edge of these three materials.

Although inventive shoe guard mat 60 is shown as being essentially rectangular in shape, this mat can be manufactured in a variety of different shapes to fit different cars and drivers. For example, this mat can be oval shaped, or even triangularly shaped—with the base of the triangle situated under or slightly in front of the foot pedals and the remainder of the inventive mat extending back towards the rear of the vehicle. Furthermore, although the inventive mat has been shown in FIG. 2 as being used in a horizontal position, the mat can be rotated and used in a different orientation, for example in a vertical direction. Furthermore, although the inventive mat has been described as being a sandwich of three different layers, this mat could be formed of two layers or even one layer provided both external surfaces of the mat have the desired properties, as described above in conjunction with top surface 61 and rear surface 68.

Although a single embodiment of the present invention has been shown and described herein, this embodiment merely illustrates the teachings of the present invention. Clearly, those skilled in the art may readily construct other embodiments that incorporate these teachings.

I claim:

1. Apparatus, adapted to be placed on a floor of a vehicle, for protecting at least one shoe worn by a driver of the vehicle from abrasion that would otherwise be caused by repeated contact between said shoe and abrasive objects situated on said floor, said apparatus comprising:
a mat that has been cut to a shape sufficiently large so as to cover an area located on a floor of a vehicle and situated in front of foot pedals of the vehicle, said area encompassing a portion of said floor which will come into contact with a surface of at least one shoe worn by said driver during operation of the foot pedals of said vehicle;
characterized in that said mat comprises:
a flat, thin, resilient material that has been cut to said shape; and
a protective material for forming a top surface of said mat wherein said protective material is affixed to one side of and overlies said resilient material and has substantially the same shape thereof, and wherein said protective material has a flat outer surface that is sufficiently tight to prevent abrasive objects, that are likely to accumulate on said floor, from becoming embedded in said outer surface.

2. The apparatus in claim 1 wherein said mat further comprises a backing material, that is substantially water resistant, affixed to an opposite side of said resilient material as said protective material and being substantially the same shape thereof.

3. The apparatus in claim 2 wherein said backing material, which forms the rear surface of said mat abuttingly contacts the floor of said vehicle and has an outer surface which is textured to prevent the mat from sliding on said floor.

4. The apparatus in claim 3 wherein said mat further comprises at least one mating portion of at least one interlocking strip which is secured to said rear surface of said mat for suitable abutting engagement with an opposite mating portion of said interlocking strip that is adapted to be secured at a desired location to said floor for preventing the mat from sliding thereon.

5. The apparatus in claim 4 wherein said mat further comprises two halves of two separate interlocking VELCRO strips, both of said halves being adhesively attached to said rear surface.

6. The apparatus in claim 4 wherein said mat further comprises a border material positioned substantially around a peripheral edge of said resilient material, said protective material and said backing material.

7. The apparatus in claim 6 wherein said border material is a satin material which is stitched to said resilient material, said protective material and said backing material.

8. The apparatus in claim 7 wherein said resilient material and said backing material are collectively formed of a vinyl backed sponge material.

9. The apparatus in claim 8 wherein said protective material is water repellent.

10. The apparatus in claim 9 wherein said protective material is formed of a fleece material with the outer surface of which being a reverse side of said fleece material.

11. A mat, adapted to be placed on a floor of a vehicle, for protecting at least one shoe worn by a driver of the vehicle from abrasion that would otherwise be caused by repeated contact between said shoe and abrasive objects situated on said floor, wherein said mat has been cut to a shape sufficiently large so as to cover an area located on a floor of a vehicle and situated in front of foot pedals of the vehicle, said area encompassing a portion of said floor which will come into contact with a surface of at least one shoe worn by said driver during operation of the foot pedals of said vehicle, said mat comprising:

a flat, thin, resilient material that has been cut to said shape;

a protective material for forming a top surface of said mat wherein said protective material is affixed to one side of and overlies said resilient material and has substantially the same shape thereof, sand wherein said protective material has a flat outer surface that is substantially impervious to abrasive objects, that are likely to accumulate on said floor, in order to prevent such objects from becoming embedded in said outer surface; and a backing material, that is substantially water resistant, affixed to an opposite side of said resilient material as said protective material and being substantially the same shape thereof.

12. The apparatus in claim 11 wherein said mat further comprises at least one mating portion of at least one interlocking strip which is secured to said rear surface of said mat for suitable abutting engagement with an opposite mating portion of said interlocking strip that is adapted to be secured at a desired location to said floor for preventing the mat from sliding thereon.

13. The apparatus in claim 12 wherein said mat further comprises a border material positioned substantially around a peripheral edge of said resilient material, said protective material and said backing material.

14. The apparatus in claim 13 wherein said border material is a satin material which is stitched to said resilient material, said protective material and said backing material.

15. The apparatus in claim 14 wherein said resilient material and said backing material are collectively formed of a vinyl backed sponge material.

16. The apparatus in claim 15 wherein said protective material is water repellent.

17. The apparatus in claim 16 wherein said protective material is formed of a fleece material with the outer surface of which being a reverse side of said fleece material.

* * * * *